Oct. 16, 1928.

G. T. RANDOL ET AL 1,687,591

GEAR SHIFTING MECHANISM

Filed Oct. 30, 1924

Inventors
G. T. Randol.
R. S. Plexico.

By Lacy & Lacy, Attorneys

Oct. 16, 1928.

G. T. RANDOL ET AL 1,687,591

GEAR SHIFTING MECHANISM

Filed Oct. 30, 1924

Inventors
G. T. Randol.
R. S. Plexico.

By Lacy & Lacy, Attorneys

Oct. 16, 1928.
G. T. RANDOL ET AL
1,687,591
GEAR SHIFTING MECHANISM
Filed Oct. 30, 1924    6 Sheets-Sheet 4
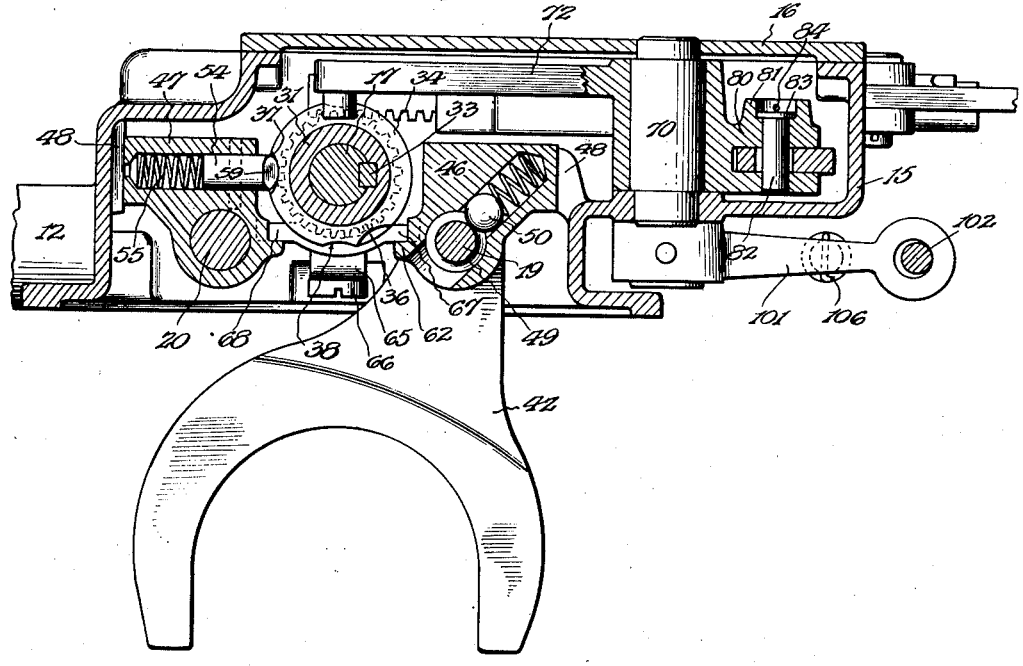
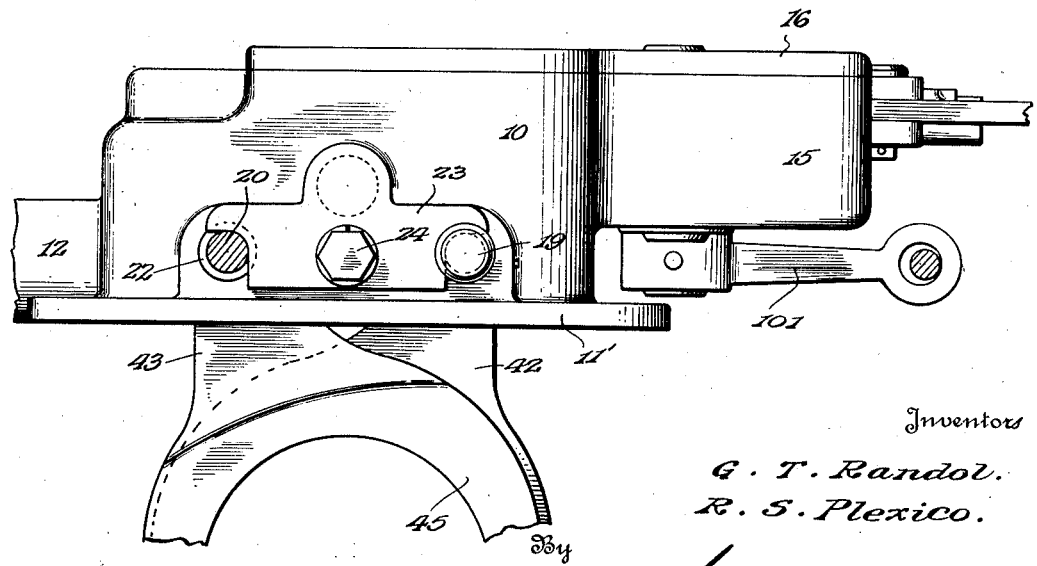
Inventors
G. T. Randol.
R. S. Plexico.
By Lacy & Lacy, Attorneys

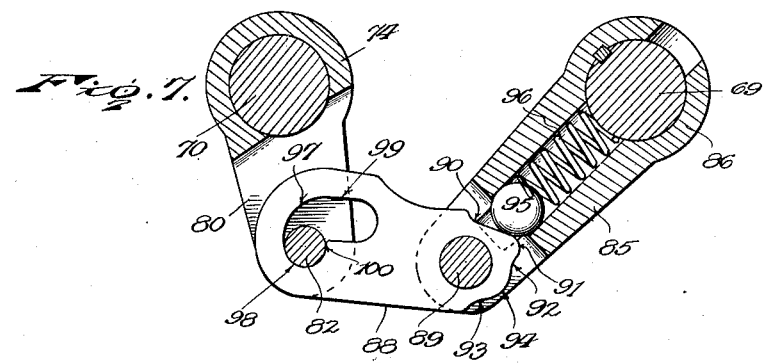
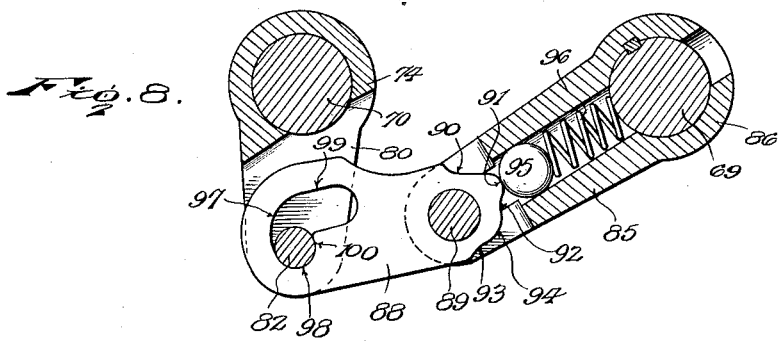
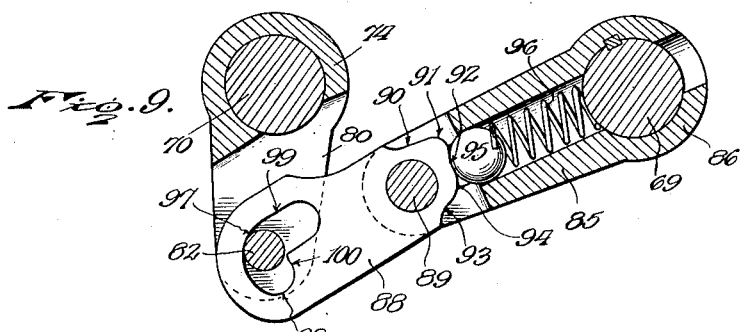
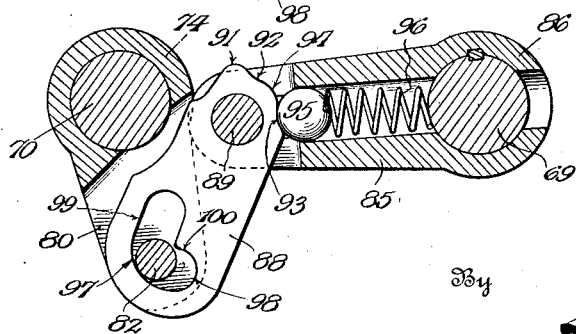

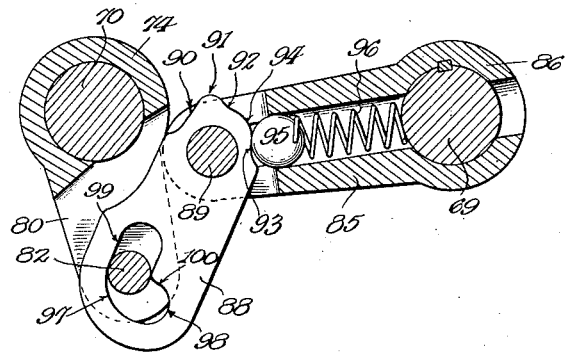
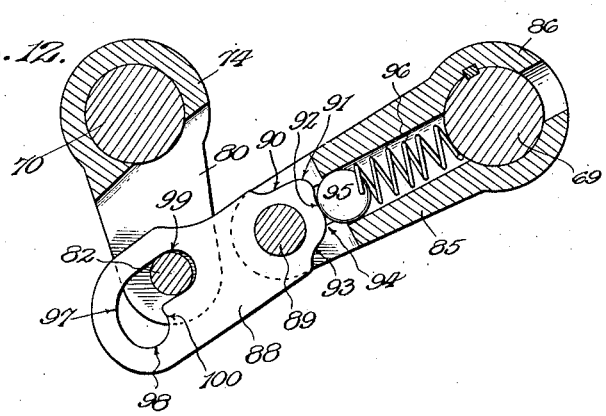
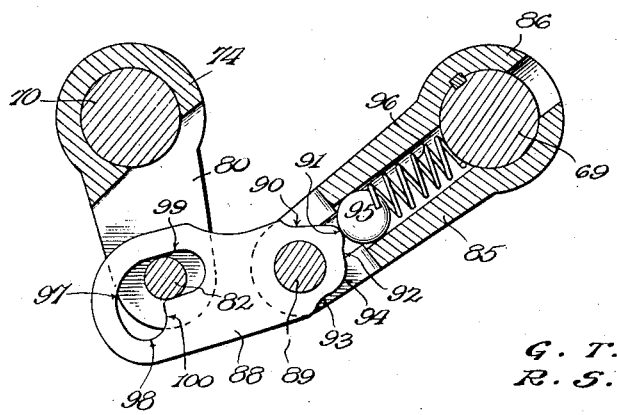

Patented Oct. 16, 1928.

1,687,591

UNITED STATES PATENT OFFICE.

GLENN T. RANDOL, OF MARMADUKE, ARKANSAS, AND ROBERT S. PLEXICO, OF MUNCIE, INDIANA; SAID PLEXICO ASSIGNOR TO SAID RANDOL.

GEAR-SHIFTING MECHANISM.

Application filed October 30, 1924. Serial No. 746,822.

This invention relates to an improved gear shifting mechanism of the general character disclosed in a prior application of G. T. Randol, filed October 25, 1922, Serial No. 596,838, a second application filed March 23, 1923, Serial No. 627,096, and a third application filed July 5, 1923, Serial No. 649,685.

In the devices disclosed in said prior applications, companion selectors are employed which are movable toward each other for neutralizing any active gear and are also movable away from each other for shifting any selected gear into mesh. Operating said selectors through suitable connections is a lever which is movable forwardly by the clutch pedal of the vehicle to accomplish the neutralizing function and is movable rearwardly by a power spring to accomplish the meshing function. However, it has been found that a spring, when employed in the situation noted, is unsuitable to perform the work assigned since difficulty is experienced in shifting the gears into mesh when the lubricant in the transmission case becomes cold or when the vehicle reaches a speed of twenty or twenty-five miles an hour, or over. Further, in the application filed March 23, 1923, Serial No. 627,096, a trip mechanism is shown for releasing the operating lever when the clutch pedal reaches a predetermined point in its forward travel, so that the power spring may function while the forward movement of the pedal may continue.

The present invention seeks, among other objects, to provide a mechanism eliminating the trip mechanism mentioned and wherein the forward movement of the clutch pedal will be utilized not only for neutralizing any active gear but also, for positively shifting any selected gear into mesh, thereby eliminating the power spring noted and providing certainty in the shifting of the gears under all temperature conditions and at all speeds of the vehicle.

The invention further seeks to provide, in conjunction with the operating lever mentioned, a novel toggle mechanism which will convert the continuous forward movement of the clutch pedal into the two-way motion necessary for shifting the selectors toward each other to neutralize an active gear, and shifting the selectors apart to carry a selected gear into mesh.

A further object of the invention is to provide a gear shift wherein wear upon the parts will not, within reasonable limits, affect the adjustment or proper operation of the mechanism but, on the contrary, will tend to increase the smoothness of its functioning, while the adjustment of the mechanism, when once set, will remain practically permanent.

And the invention seeks, as a still further object, to provide a gear shift which, while being particularly applicable for use in connection with sliding gear transmissions, will also be equally applicable for use in connection with that type of transmission called "constant-mesh" in which all the gears run in mesh and the different changes in speed are effected through the actuation of sliding collars or jaw clutches.

Other and incidental objects will appear hereinafter.

In the accompanying drawings:

Figure 5 is a transverse sectional view on the line 5—5 of Figure 2, looking in the direction indicated by the arrows.

Figure 6 is an end view particularly showing the locking plate for the selector shaft and shifter rods.

Figures 7, 8, 9 and 10 are like sectional views showing the toggle mechanism and illustrating the different positions assumed by the parts incident to the working throw of the mechanism.

Figures 11, 12 and 13 are like sectional views of the toggle mechanism and showing different positions assumed by the parts incident to the return throw of the mechanism.

The present invention is, in many respects, similar to the mechanical gear shifts disclosed in the prior applications of G. T. Randol, which applications have herein been previously identified. It will, therefore, be unnecessary to describe in lengthy detail that part of the present mechanism which is, in the main, repeated from the prior applications. However, care will be taken to give sufficient explanation to afford a clear understanding of the present improvements.

Figure 3:
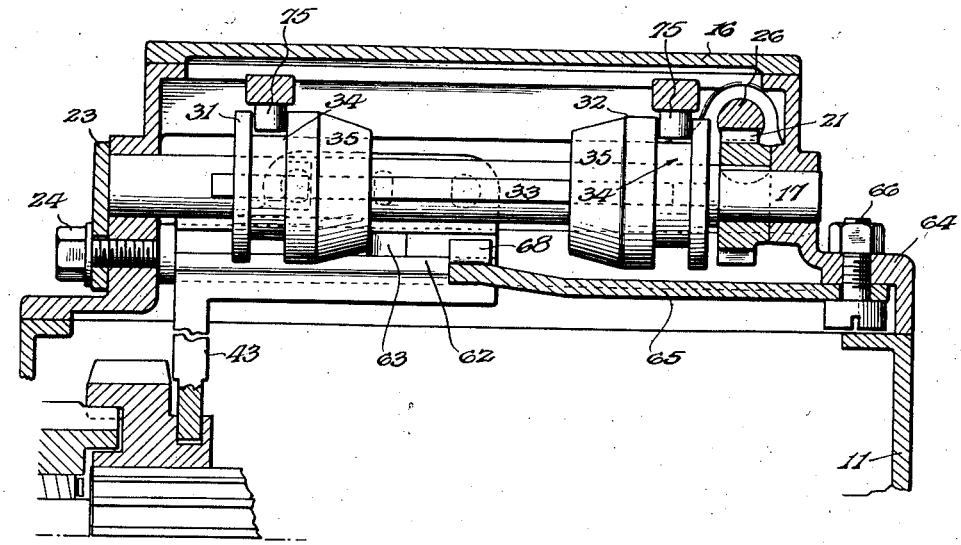
Figure 3 is a longitudinal sectional view on the line 3—3 of Figure 2, looking in the direction indicated by the arrows.

Referring now more particularly to the drawings, the numeral 10 indicates a casing which, as shown in Figure 3, is formed to fit over the usual opening at the top of a motor vehicle transmission case, indicated at 11, and formed on the casing is a base flange 11' apertured to accommodate cap bolts connecting the casing with the transmission case. At one side, the casing 10 is formed with a sleeve 12 to receive a stub shaft 13 mounting an emergency brake lever, as conventionally illustrated at 14. At its opposite side, the casing is formed with a reduced extension 15 and normally closing the casing is a removable cover plate 16. Journaled through the end walls of the casing is a medial selector shaft 17 at opposite sides of which are mounted rods 19 and 20 extending parallel to said shaft, and fixed to the shaft is a pinion 21 limiting the shaft against rearward movement. Formed in the forward ends of the rods 19 and 20 are, as shown in Figure 6, annular grooves 22 and overlying the forward end of the shaft 17 is a locking plate 23 detachably secured to the forward end wall of the casing by a cap bolt 24. Thus, the locking plate will limit the shaft against forward displacement while, at its ends, the plate is cut away to engage in the grooves 22 of the rods 19 and 20 for also holding these rods in position. Formed on the casing in alinement with the pinion 21 is a sleeve 25 and slidable through said sleeve is a rack bar 26 meshing with said pinion. Projecting from the extension 15 of the casing are ears 27 between which is pivoted a bell crank 28 and formed in the outer end of the rack bar 26 to freely accommodate one end of the bell crank is a slot 29. Pivotally connected to the opposite end of the bell crank is a rod 30 which is coupled, by suitable connections, with an appropriate hand lever preferably arranged upon the steering wheel of the vehicle so that the hand lever may be shifted for rocking the bell crank and sliding the rack bar 26 endwise for rotating the selector shaft 17.

Figure 4:
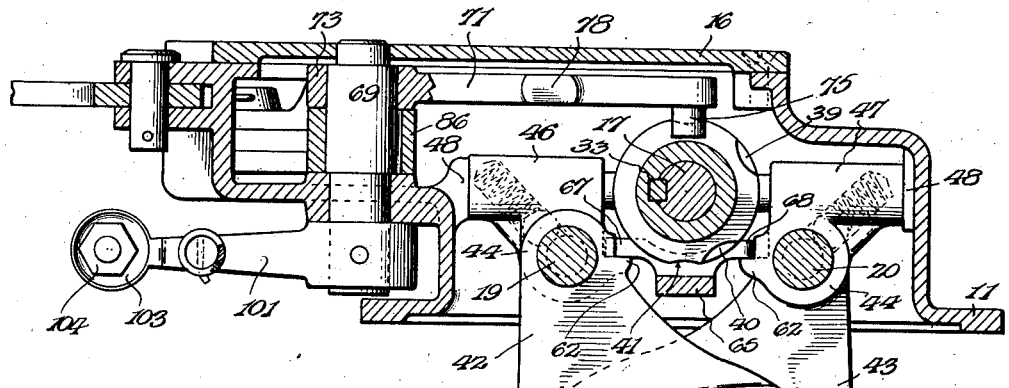
Figure 4 is a transverse sectional view on the line 4—4 of Figure 2, looking in the direction indicated by the arrows.

Slidable on the shaft 17 are companion selectors 31 and 32 which are rotatably connected with the shaft by a key 33. At their outer ends, the selectors are formed with channels 34 while at their inner ends the selectors are provided with conical faces 35. Formed in the selector 31 at circumferentially spaced points is, as shown in Figure 5, a low speed socket 36 and a high speed socket 37 while at diametric points, the selector is further provided with concave neutral seats 38. Similarly, the selector 32 is, as shown in Figure 4, provided with a second speed socket 39, a reverse socket 40, and with diametric neutral seats 41. The sockets 36, 37, 39 and 40 are all identical and open into the channels 34 of the selectors, the sockets being provided with concave bottom walls and flat inner end walls. Likewise, the seats 38 and 41 are all identical and are provided with concave bottom walls.

Figure 2:
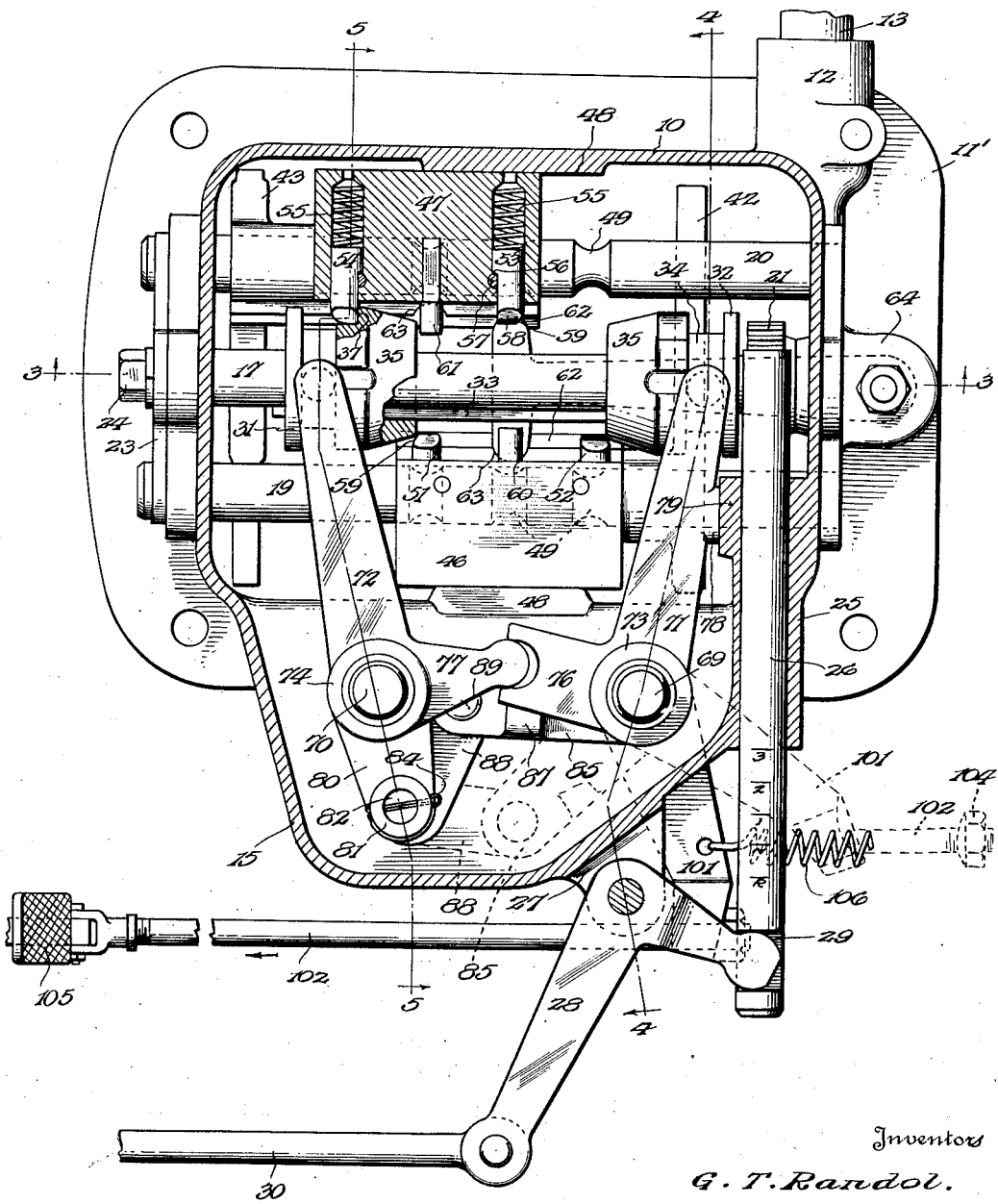
Figure 2 is a view similar to Figure 1, but showing the position of the selectors when moved apart for shifting a selected gear into mesh.

As brought out in Figures 4 and 5 of the drawings, the rods 19 and 20 are disposed below the shaft 17 and slidable on said rods are companion gear shifters 42 and 43. These gear shifters are provided with sleeves 44 to accommodate the rods and are formed to extend into the transmission case 11, being provided at their lower ends with forks 45 to engage the sliding gears of the transmission. Formed on the upper sides of the sleeves 44 are overhanging oblong heads 46 and 47 having smooth outer edges, and formed on the casing 10, as particularly seen in Figures 2 and 4, are smooth raised bearing surfaces 48 to slidably coact with the outer edges of said heads so that the shifters are thus limited against rocking movement on the rods 19 and 20 such as would swing the heads apart. Formed in the rods 19 and 20 are longitudinally spaced annular grooves 49, each of the rods being provided with three of said grooves, and mounted upon the heads 46 and 47 of the shifters are, as shown in Figure 5, spring pressed ball detents 50 selectively engageable in said grooves for holding the shifters stationary in the different positions thereof.

Slidable in suitable sockets in the head 46 of the shifter 42 is a low speed plunger 51 and a reverse plunger 52. Similarly mounted upon the head 47 of the shifter 43 is a second speed plunger 53 and a high speed plunger 54. All of these plungers are of like construction and arranged behind said plungers are springs 55 pressing the plungers outwardly to yieldably coact with the selectors. However, to prevent the ejection of the plungers, said plungers are, as best seen in Figure 2, provided at corresponding sides thereof with shoulders 56, and removably fitting in suitable openings in the heads 46 and 47 of the shifters to coact with said shoulders are stop pins 57 limiting the plungers in their outward movement as well as against rotation. At their outer ends, the plungers are formed with rounded faces 58 to fit the concave bottom walls of the sockets and seats of the selectors and are also provided with beveled faces 59 to coact with the conical faces 35 of the selectors. Projecting from the inner longitudinal edges of the shifter heads between the pairs of plungers thereon are like fixed pins 60 and 61. When in neutral, the shifters 42 and 43 are, as illustrated in connection with the shifter 42 in Figure 2, disposed centrally on the rods 19 and 20, while the selectors 31 and 32 normally stand apart at the end of their outward throw. As will later be explained, means are provided for simultaneously shifting the selectors.

Figure 1:
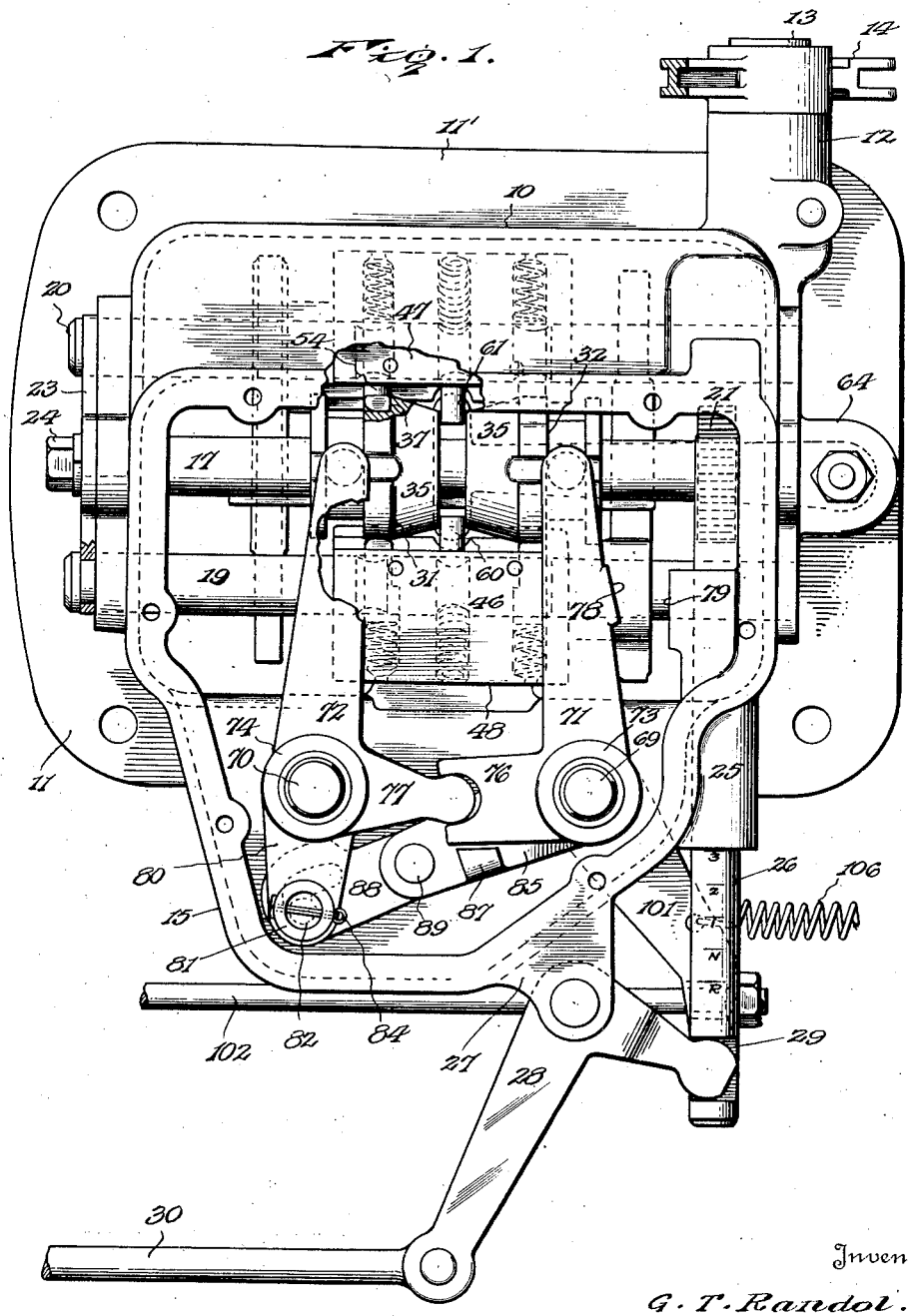
Figure 1 is a plan view of the improved gear shift, the cover of the casing being removed and showing the position of the selectors when centralized to neutralize an active gear.

Since the selectors 31 and 32 are keyed to the shaft 17, it will be seen, in view of the foregoing, that said selectors may be rotatably set by means of the hand lever on the steering wheel and it will now be assumed that it is desired to shift the high speed gear. In such instance, the selectors are first set to dispose the socket 37 of the selector 31 in alinement with the plunger 54. Accordingly, when the selectors are then shifted inwardly toward each other, as shown in Figure 1, the plunger 54 will drop into said socket coupling the shifter 43 with the selector 31 so that when the selectors are then moved apart, the shifter 43 will, as shown in Figure 2, be carried forwardly for shifting the high speed gear into mesh. Similarly, the low speed gear may be shifted by setting the selectors to dispose the socket 36 in alinement with the plunger 51 of the shifter 42 when, upon movement of the selectors toward each other, the plunger will drop into said socket so that when the selectors are then moved apart, said shifter will be carried forward for shifting the low speed gear into mesh. A similar operation will, as will be appreciated, take place in connection with the shifting of the second speed gear and the reverse gear. When the selectors are set to dispose the socket 39 in alinement with the plunger 53, said plunger will, when the selectors are moved inwardly, drop into said socket so that upon the return outward throw of the selectors, the shifter 43 will be carried rearwardly for shifting the second speed gear into mesh. Similarly, when the shifters are set to dispose the socket 40 in alinement with the plunger 52, inward movement of the selectors will permit the plunger to engage in said socket when, upon outward movement of the selectors, the shifter 42 will be carried rearwardly for shifting the reverse gear into mesh. Thus, the selectors may be rotatably set for selecting the different speed gears while said selectors are shiftable toward and away from each other to effect the shifting of any gear selected and, in this connection, attention is directed to the fact that the sockets 36, 37, 39 and 40 of the selectors are all staggered with respect to each other so that no two of the plungers can be engaged with the selectors at the same time. Accordingly, in no instance will any gear other than the gear selected, be shifted. However, the neutral seats 38 and 41 of the selectors are disposed in alinement and these seats are provided in order that when setting the mechanism in neutral position, the operator may tell, by the engagement of the plungers in said seats, when the neutral position is reached and also to prevent selectors from turning and being engaged by any of the plungers when the selectors are moved with selection set for neutral position.

Assuming the high speed gear to have been shifted so that the shifter 43 occupies a forward position, as shown in Figure 2 of the drawings, attention is now directed to the fact that the selectors may be rotatably set to select a future gear. In such instance, the plunger 54 will be caused to ride out of the socket 37 onto the periphery of the selector 31. A like action would, of course, take place in connection with any of the other plungers upon the selection of a future gear so that without regard as to whether or not any gear may be active, the mechanism may be freely set to select any other gear. Further, attention is directed to the fact that since the pins 60 and 61 of the shifters project between the inner ends of the selectors, the selectors will, when moved inwardly, cooperate with said pins for centralizing the shifters and consequently returning any active gear to neutral before any future gear selected is shifted. The rounded faces 58 of the plungers will, of course, facilitate the movement of the plungers out of the sockets of the selectors, when the selectors are set, while the beveled faces 59 of the plungers will, when the selectors are shifted inwardly across the plungers of the shifter in neutral, coact with the conical faces 35 of the selectors and thus facilitate the inward movement of the selectors as well as facilitate the inward movement of the plungers against the spring tension thereon. Also, since one of the shifters will always remain in neutral position when the other shifter is moved for carrying a selected gear into mesh, and vice versa, the beveled faces 59 of the plungers of the shifter remaining in neutral position will, as illustrated in connection with the shifter 42 in Figure 2, coact with the inner ends of the selectors for yieldably holding the selectors at the limit of their outward throw. Thus, in the instance taken, the selector 31 will be held to cooperate with the plunger 54 for maintaining the high speed gear active. A like result would, of course, follow in connection with any one of the other speed gears.

Formed on the sleeves 44 of the shifters 42 and 43 at the confronting sides of said sleeves are, as clearly seen in Figures 2 and 4, longitudinally extending ledges 62 in the side walls of which are provided semi-circular notches 63. When the shifters are in neutral position, as shown in Figure 1, these notches are disposed opposite each other. Formed on the rear end wall of the casing 10 in the angle between said wall and the base flange 11 of the casing is, as clearly shown in Figures 1 and 3, an upstanding housing 64 and swingingly mounted at its rear end in said housing is a latch 65 secured by a pivot bolt 66 extending through the top wall of the housing. At its forward end, the latch is provided with a T-head, being, as particularly shown in Figure 4, formed with like upturned lateral lugs 67 and 68 which overhang the ledges 62 of the shifters to slidably rest thereon. The lugs 67 and 68 are provided with rounded ends to loosely fit in the notches 63 of the shifters, and attention is now directed to the fact that the major distance between the ends of said lugs is substantially equal to the distance between the side wall of either of the ledges 62 and the bottom of the notch of the other ledge. Accordingly, when the shifter 42 is moved either forwardly or rearwardly for shifting a selected gear, the wall of the notch 63 of said shifter will coact with the rounded end of the lug 67 for riding the lug out of said notch and swinging the latch to engage the lug 68 in the notch 63 of the selector 43, when the side wall of the ledge of the shifter 42 will coact with the end of the lug 67 for limiting the latch against swinging movement and maintaining the lug 68 engaged in the notch of the shifter 43. Similarly, upon the forward or rearward movement of the shifter 43, the lug 68 of the latch will be caused to ride out of the notch of said shifter and the latch swung to engage the lug 67 in the notch 63 of the shifter 42, when the side wall of the ledge of the shifter 43 will coact with the lug 68 for maintaining the lug 67 engaged in the notch of the shifter 42. Thus, as the mechanism is operated to shift any selected gear, as previously described, the latch 65 will automatically function, when either shifter is moved, to positively lock the other shifter in neutral position so that by no possibility can more than one speed gear become active at any one time.

The means employed for simultaneously actuating the shifters now remains to be described. Journaled at its lower end through the bottom wall of the extension 15 and at its upper end through the cover 16, is, as shown in Figure 4, a vertical shaft 69, and similarly mounted in spaced parallel relation to said shaft is, as shown in Figure 5, a shaft 70 which, however, is preferably fixed to the bottom wall of the extension so that the shaft 70 will thus be secured against rotation. Loosely mounted on the shaft 69 is a lever 71 and similarly mounted on the shaft 70 is a coacting lever 72. The lever 71 is provided with a hub sleeve 73 to rotatably fit the shaft 69 while the lever 72 is provided with a hub sleeve 74 to fit the shaft 70, and formed on the forward ends of the levers are, as best shown in Figure 3, studs 75 which freely engage in the channels 34 of the shifters 31 and 32. Extending from the sleeve 73 of the lever 71 in angular relation to said lever, is an arm 76 notched at its free end, and extending from the sleeve 74 of the lever 72 is an angularly disposed arm 77 rounded at its outer end to freely engage in said notch for coupling the levers to swing in unison. Thus, when the levers are swung in one direction, the shifters 31 and 32 will be moved toward each other, as shown in Figure 1, while when the levers are swung in the opposite direction, the shifters will, as shown in Figure 2, be moved apart and formed on the lever 71 is a boss 78 to coact with a stop 79 on the inner end of the sleeve 25 for limiting the levers in their outward throw. As best seen in Figure 5, the lever 72 terminates at its rear end in a yoke 80 which is integrally formed on the sleeve 74 of said lever and, as will be observed, the upper side of said yoke is provided with a seat 81. Extending freely through the yoke is a pivot pin 82 provided at its upper end with a head 83 countersunk in said seat and supporting the pin in position. Extending through the rim of the seat, above the head 83 of the pin, is a removable key 84 limiting the pin against upward displacement.

Associated with the levers 71 and 72 is a toggle mechanism for actuating said levers. Fixed to the shaft 69 is a toggle lever 85 provided at its inner end, as shown in Figure 4, with a sleeve 86 which is keyed to said shaft beneath the sleeve 73 of the lever 71, so that when the shaft is turned, the toggle lever will swing therewith. Upstanding from the outer end portion of the toggle lever to engage the arm 76 of the lever 71 is a lug 87, and coacting with said toggle lever is a toggle link 88 pivotally connected with the lever 85 by a pin 89. As shown in Figure 7, and the following figures of the drawings, the inner end of the link is provided at its forward edge with a relatively steep cam face 90 which rises in the direction of the longitudinal axis of the link to a peak 91, while, at its rear edge, the link is formed with slightly concave cam faces 92 and 93 sloping up to the peak 91 but separated by a secondary rounded peak 94 less prominent than the former peak. As will be observed, the peak 91 is located forwardly of the longitudinal axis of the link while the center of the cam face 92 is located rearwardly of said axis. Formed in the lever 85 from the inner end thereof, is a longitudinal bore in which is mounted a ball detent 95 and confined between the shaft 69 and the detent is a spring 96 urging the detent to coact with the cam faces of the link. At its opposite end, the link is freely received between the sides of the yoke 80 of the lever 72 and formed in the adjacent end portion of the link is an L-shaped slot 97 freely accommodating the pin 82, which pin thus serves to pivotally connect the link with said lever. As shall presently appear, the link not only swings on the pin 82 as a center but is caused to shift relative to the pin and the pin is, therefore, mounted for free rotation, as previously described, in order to reduce friction and assist the free shifting of the link. The slot 97 is formed with a transversely extending short leg 98 providing a seat, and a long leg 99 extending longitudinally of the link, while the forward edge of the slot is curved to gradually connect said legs. However, the rear edge of the slot is formed with a shoulder 100 at the angle between the legs of the slot and, as will be noted, the seat 98 is of a radius substantially equal to that of the pin 82 so as to fit said pin, while the shoulder 100 extends somewhat beyond the axis of said seat to provide ample bearing surface at the shoulder to coact with the pin. At the forward end of the shoulder, the corner thereof is rounded off to ride over the pin.

Keyed to the lower end of the shaft 69 is, as best shown in Figure 4, an operating lever 101, and slidable through the outer end of the lever is a rod 102. At its rear side, the lever is formed with a hemi-spherical seat 103 and screwed on the rod is a nut 104 having a hemi-spherical face to fit said seat. Thus, the nut may rock in the seat as the lever is swung. At its forward end, the rod is suitably connected with the clutch pedal of the vehicle and, in Figure 2 of the drawings, we have conventionally illustrated a clutch pedal at 105. In this figure of the drawings, the clutch pedal is shown at the end of its forward throw and, consequently, the lever 101 is swung forwardly. Connected at one end to the lever is a spring 106, the opposite end of which is suitably anchored so that the spring will function to return the lever when the clutch pedal is released. Normally, the lever 101 will stand in the position shown by dotted lines in Figure 2, while the nut 104 of the rod 102 will, as also shown in dotted lines in this figure of the drawings, stand away from the lever. The clearance between the nut and the lever is sufficient to permit the clutch pedal 105 to be rocked forwardly substantially half the length of its travel for disengaging the clutch of the vehicle, when continued forward movement of the clutch pedal will then serve to swing the lever 101 forwardly. After the clutch pedal reaches its middle position, the ensuing quarter of the forward travel of the clutch pedal is, as will be later explained, utilized for shifting the selectors 31 and 32 toward each other, as shown in Figure 1, for neutralizing any active gear, while the last quarter of the forward travel of the clutch pedal is utilized for moving the selectors apart and shifting into mesh any gear selected.

Normally, the toggle lever 85 and link 88 stand in the dotted line position shown in Figure 2, while, as previously indicated, the levers 71 and 72 stand swung apart at their forward ends. The normal position of the lever 85 and link 88 is illustrated in detail in Figure 7, and, in this position of the parts, the toggle mechanism may well be termed as set, since said mechanism is ready to function. As will be observed, the detent 95 bears against the cam face 90 of the link and thus tends to swing the link on the toggle pin 89 so that the outer end of the link, or that end provided with the slot 97, is urged forwardly to maintain the seat 98 in engagement with the pin 82. Thus, the detent yieldably holds the link in forward angular relation to the lever 85.

Assuming now that the lever 101 is swung forwardly by the clutch pedal 105, the shaft 69 will be rotated so that the lever 85 will, in turn, be swung forwardly to the position shown in Figure 8. During this first portion of the forward travel of the lever 101, the lever 85 and link 88 function as a toggle so that, as the lever 85 is swung forwardly, the shoulder 100 coacts with the pin 82 for swinging the rear end of the lever 72 outwardly in a direction away from the shaft 69. The forward end of the lever 72 will, therefore, be swung inwardly while, since the levers 71 and 72 are connected to swing in unison, the forward end of the lever 71 will, as a result, also be swung inwardly. Accordingly, the selectors will be simultaneously shifted inwardly toward each other to neutralize any active gear.

Figure 8 shows, substantially, the end of the toggle throw. Forward movement of the lever 85 serves, of course, to swing the link 88 on the toggle pin 89 so that the detent 95 is thus caused to ride up the cam face 90 to the peak 91 thereof. Throughout the toggle throw of the lever and the link, the detent will, therefore, function to maintain the shoulder 100 firmly seated against the pin 82. Further forward swinging movement of the lever 101 will then serve to swing the inner end of the link 88 forwardly and shift the peak 91 of the cam face from beneath the detent when, as shown in Figure 9, the detent coacts with the cam face 92 of the link for swinging the outer end of the link rearwardly and breaking the toggle. The independent swinging movement of the link, under the action of the detent spring 96 is, of course, very quick since the spring has been compressed by the movement of the peak 91 of the cam beneath the detent 95 so that at the moment when the toggle breaks, the spring exerts its maximum pressure on the link. The energy of the spring is, therefore, amply sufficient to carry the seat 98 rearwardly away from the pin 82 so that the pin stands in the angle between the legs of the slot 97. Coincident with the breaking of the toggle, the lug 87 is brought into engagement with the arm 76 of the lever 71 and at this point in the movement of the lever 85, the lever 101 has traveled substantially half of its forward throw. As the forward movement of the lever 101 is continued and the lever 85 is thus also further swung forwardly, the lug 87, therefore, coacts with the arm 76 for swinging the forward end of the lever 71 outwardly and, consequently, through the medium of the connections between the levers 71 and 72, the forward ends of both levers are swung away from each other for simultaneously shifting the selectors apart so that any gear selected is carried into mesh.

As the lever 85 swings forwardly from the position shown in Figure 9, to the position shown in Figure 10, the rear end of the lever 72 swings inwardly, of course, in the direction of the shaft 69, so that during the last half of the forward throw of the lever 85, the link 88 is independently swung rearwardly on the toggle pin 89 by the pin 82. Accordingly, the cam peak 94 at the inner end of the link is rocked forwardly beneath the detent 95, when the detent coacts with the cam face 93 for rocking the link and swinging the outer end thereof rearwardly independently of the pin 82 and faster than the travel of said pin. Thus, the seat 98 is held away from the pin 82 in front thereof. This is done since, as the lever 85 approaches the end of its forward travel and the pin 82 is being swung inwardly in an arc at the rear of said lever, a situation is created such that the pin 82 travels toward the seat 98 and, unless the link is independently swung, would enter said seat. However, in order that the link may move endwise relative to the pin upon the return throw of the lever 85, it is imperative to avoid the seating of the pin and, accordingly, the cam peak 94 is provided upon the link to coact with the detent 95 for resisting the entering thrust of the pin. Furthermore, the link is, by reason of the disposition of the cam peak 94, brought into such angular relation to the lever 85 that the pin 82 cannot, in its movement, overcome the leverage of the detent upon the link. Thus, at the end of the forward throw of the lever 85, the pin 82 will, as shown in Figure 10, always rest in the angle between the legs of the slot 97 of the link.

When the lever 101 reaches the end of its forward travel and the clutch pedal 105 is released, the spring 106 will, of course, immediately function to return said lever to its original position. During the first portion of the return movement of the lever 101, the lever 85 will swing from its extreme forward position shown in Figure 10, rearwardly to the position shown in Figure 11. As will be observed, the pin 82 is received in the long leg 99 of the slot 97 of the link 88 while the link is shifted endwise toward said pin. As the rearward movement of the lever 85 continues, the link is, as shown in Figure 12, further shifted endwise toward the pin 82, being still accommodated by the leg 99 of the slot 97, and is also swung on the toggle pin 89 into substantial alinement with the lever. During the last portion of the return throw of the lever 101, the lever 85 is then swung further rearwardly from the position shown in Figure 12 to the position shown in Figure 13. At this time, the pin 89 crosses the pivotal center of the toggle while the outer end of the link is carried forwardly by the pin 82 and the link thus independently swung on the toggle pin. Accordingly, as the lever 101 travels on to the end of its rearward throw and the lever 85 returns to the position shown in Figure 7, the pin 89 is carried away from the pin 82 so that the link is shifted endwise away from the pin 82. The outer end of the link is also carried further forward by the pin 82 so that the link is swung until the cam peak 91 is rocked rearwardly beneath the detent 95. The endwise shifting of the link away from the pin 82 is, of course, coincidently continued so that when the cam peak 91 crosses beneath the detent, the pin 82 again stands in the angle between the legs of the slot 97. The outer end of the link is thus free to swing forwardly and the detent 95 accordingly coacts with the cam face 90 of the link to quickly rock the link and snap the forward end thereof forwardly, as shown in Figure 7, to engage the seat 98 about the pin 82, thereby again setting the toggle mechanism.

It will accordingly be seen, in view of the foregoing, that during the first portion of the forward travel of the lever 85, the toggle is effective for swinging the forward ends of the levers 71 and 72 toward each other to neutralize any active gear, when the toggle is automatically broken and the remainder of the forward travel of the lever 85 utilized for swinging the forward ends of the levers 71 and 72 away from each other to accomplish the shifting of any gear selected. However, upon the rearward throw of the lever 85, the toggle is, as previously described in detail, ineffective, so that the toggle mechanism is set without disturbing the position of the levers 71 and 72.

Having thus described the invention, what we claim is:

1. A gear shifting mechanism including gear shifting means, means including associated levers having a cycle of movement in opposite directions for operating said shifting means, actuating means, and toggle mechanism operable by said actuating means when moved in one direction for moving the levers through said cycle.

2. A gear shifting mechanism including a gear shifting means, means including associated levers connected to move in unison and having a cycle of movement in opposite directions for operating said shifting means, a foot pedal, and toggle mechanism operable upon the forward throw of the pedal for moving the levers through said cycle.

3. A gear shifting mechanism including selecting means movable in opposite directions, gear shifting means movable by said selecting means, means including coacting levers having a cycle of movement in opposite directions for shifting said selecting means, actuating means, and toggle mechanism operable by said actuating means when shifted in one direction for moving the levers through said cycle.

4. A gear shifting mechanism including selecting means movable in opposite directions, gear shifting means movable by said selecting means, means including coacting levers connected to swing in unison and having a cycle of movement in opposite directions for shifting said selecting means, actuating means, and toggle mechanism operable by said actuating means upon the forward throw thereof for moving the levers through said cycle.

5. A gear shifting mechanism including selecting means, gear shifting means movable thereby, the selecting means being movable toward each other for neutralizing an active gear and away from each other for shifting a selected gear, means including associated levers having a cycle of movement toward and away from each other for shifting said selectors, actuating means, and toggle mechanism operable by said actuating means when moved in one direction for moving the levers through said cycle.

6. A gear shifting mechanism including selecting means movable in opposite directions, gear shifting means movable by said selecting means, means including coacting levers connected to swing in unison and having a cycle of movement in opposite directions for shifting said selecting means, a foot pedal, and toggle mechanism operable by said foot pedal upon the forward throw thereof for swinging the levers through said cycle.

7. A gear shifting mechanism including selecting means, gear shifting means movable thereby, the selecting means being movable toward each other for neutralizing an active gear and away from each other for shifting a selected gear, means including companion levers connected to swing in unison and having a cycle of movement toward and away from each other for shifting said selectors, a foot pedal, and toggle mechanism operable by the foot pedal upon the forward throw thereof for swinging the levers through said cycle.

8. A gear shifting mechanism including gear shifting means, means including coacting levers connected to swing in unison and shiftable in opposite directions for moving said shifting means in opposite directions, and a toggle connected to one of said levers and movable for a portion of its throw for swinging the levers in one direction and for the remainder of said throw to coact with the other of said levers for swinging the levers in the opposite direction.

9. A gear shifting mechanism including gear shifting means, means including coacting levers connected to swing in unison and shiftable in opposite directions for moving said shifting means in opposite directions, a toggle connected to one of said levers and movable for a portion of its throw for swinging the levers in one direction and for the remainder of said throw to coact with the other of said levers for swinging the levers in the opposite direction, and a foot pedal for actuating the toggle.

10. A gear shifting mechanism including gear shifting means, means including coacting levers connected to swing in unison and shiftable toward and away from each other at their forward ends for swinging said shifting means in opposite directions, and a toggle connected to the rear end of one of said levers and movable for a portion of its throw in one direction for swinging the forward ends of the levers toward each other, the toggle being provided with means to coact with the other of said levers for swinging the forward ends of the levers away from each other as said throw of the toggle is completed.

11. A gear shifting mechanism including gear shifting means, means including coacting levers connected to swing in unison and shiftable toward and away from each other at their forward ends for swinging said shifting means in opposite directions, a toggle connected to the rear end of one of said levers and movable for a portion of its throw in one direction for swinging the forward ends of the levers toward each other, the toggle being provided with means to coact with the other of said levers for swinging the forward ends of the levers away from each other as said throw of the toggle is completed, and a foot pedal for actuating the toggle.

12. A gear shifting mechanism including gear shifting means, means including coacting levers connected to swing in unison and shiftable toward and away from each other for moving said shifting means, and a toggle having means to coact with one of said levers and connected to the other of said levers for movement in one direction across the pivotal center of the toggle for swinging the levers toward and away from each other successively.

13. A gear shifting mechanism including gear shifting means, means including coacting levers having a cycle of movement toward and away from each other at their forward ends for moving said shifting means in opposite directions, the levers being provided adjacent their rear ends with articulated arms connecting the levers to swing in unison, and a toggle having a lug to coact with the arm of one of said levers and connected to the rear end of the other of said levers for movement across the pivotal center of the toggle for swinging the forward ends of the levers through said cycle.

14. A gear shifting mechanism including gear shifting means, means including coacting levers connected to swing in unison and having a cycle of movement toward and away from each other for moving said shifting means, a toggle having means to coact with one of said levers and pivotally connected to the other of said levers for movement in one direction across the pivotal center of the toggle for swinging the levers through said cycle, and means for rendering the toggle inactive for movement in the opposite direction.

15. A gear shifting mechanism including gear shifting means, means including coacting levers connected to swing in unison and having a cycle of movement toward and away from each other for moving said shifting means, a toggle having means to coact with one of said levers and pivotally connected with the other of said levers for swinging the levers through said cycle upon the forward throw of the toggle across the pivotal center thereof, and means for rendering the toggle inactive during the rear throw thereof.

16. A gear shifting mechanism including gear shifting means, means including coacting levers connected to swing in unison and having a cycle of movement toward and away from each other for moving said shifting means, a toggle associated with said levers and operable upon the forward throw thereof across the pivotal center of the toggle for swinging the levers through said cycle, and means for automatically rendering the toggle inactive at a point in its forward throw.

17. A gear shifting mechanism including gear shifting means, means including coacting levers connected to swing in unison and having a cycle of movement toward and away from each other for moving said shifting means, a toggle associated with said levers and operable upon the forward throw thereof across the pivotal center of the toggle for swinging the levers through said cycle, and means for rendering the toggle inactive whereby the toggle may return through its rear throw without affecting the position of the levers.

18. A gear shifting mechanism including gear shifting means, means including coacting levers connected to swing in unison and having a cycle of movement toward and away from each other for moving said shifting means, a toggle associated with said levers and operable upon the forward throw thereof across the pivotal center of the toggle for swinging the levers through said cycle, and means for rendering the toggle inactive at a point in its forward throw and operable to automatically set the toggle upon the rear throw thereof to subsequently act upon the levers.

19. A gear shifting mechanism including gear shifting means, means including coacting levers connected to swing in unison and having a cycle of movement toward and away from each other for moving said shifting means, a toggle associated with said levers and operable upon the forward throw thereof across the pivotal center of the toggle for swinging the levers through said cycle, and means for rendering the toggle inactive at a point in its forward throw and operative to automatically set the toggle at the end of its rearward throw to act on said levers.

20. A gear shifting mechanism including gear shifting means, means mounted to oscillate for imparting a two-way movement to said shifting means, a foot pedal, and toggle mechanism operable by said pedal upon the forward throw thereof for imparting a pedal driven two-way oscillating movement to said second mentioned means.

21. A gear shifting mechanism including companion gear shifters, means mounted to oscillate for imparting a two-way movement to said shifters, actuating means, and toggle mechanism driven by one-way movement of said actuating means for rocking said oscillating means and moving said shifters towards and away from each other.

22. A gear shifting mechanism including gear shifting means, means mounted to oscillate for imparting a two-way movement to said shifting means, actuating means, and toggle mechanism for converting one-way movement of said actuating means into a two-way movement of said oscillating means.

23. In gear shifting mechanism, gear shifting means, actuating elements for said means connected to swing in unison and having a cycle of movement towards and away from each other for moving said shifting means in opposite directions, swingingly mounted toggle levers, a link pivotally connecting said levers to form a toggle movable forwardly across the pivotal center thereof for swinging said elements through a portion of said cycle, means carried by one of the levers to coact with one of said elements for swinging said elements through the remainder of said cycle incident to the continued forward movement of the toggle, means for swinging the toggle and means carried by one of said levers to coact with the link for swinging the link independently and breaking the toggle at a point in its forward throw.

24. In gear shifting mechanism, gear shifting means, actuating elements for said means connected to swing in unison and having a cycle of movement towards and away from each other for moving said shifting means in opposite directions, swingingly mounted toggle levers, a link pivotally connecting said levers to form a toggle movable forwardly across the pivotal center thereof for swinging said elements through a portion of said cycle, means carried by one of the levers to coact with one of said elements for swinging said elements through the remainder of said cycle incident to the continued forward movement of the toggle, means for swinging the toggle, and a spring actuated detent carried by one of said levers to coact with the link for swinging the link independently and breaking the toggle at a point in its forward throw as well as holding the link inactive during the rearward throw of the toggle.

25. In gear shifting mechanism, gear shifting means, swingingly mounted actuating elements for said means connected to swing in unison, swingingly mounted toggle levers, a pivot pin carried by one of said levers, a link pivotally mounted upon the other of said levers and provided with a slot freely receiving said pin, the link being provided with means to coact with the pin and pivotally connecting the levers to form a toggle movable forwardly across the pivotal center thereof for swinging said elements, means for swinging the toggle, and means coacting with said link for swinging the link independently relative to said pin and breaking the toggle at a point in its forward throw.

26. In gear shifting mechanism, gear shifting means, swingingly mounted actuating elements for said means connected to swing in unison, swingingly mounted toggle levers, a pivot pin carried by one of said levers, a link pivotally mounted upon the other of said levers and provided with a slot freely receiving said pin, the link being provided with means to coact with the pin and pivotally connecting the levers to form a toggle movable forwardly across the pivotal center thereof for swinging said elements, means for swinging the toggle, and a spring actuated detent carried by one of said levers to coact with the link for swinging the link independently and breaking the toggle at a point in its forward throw as well as holding the link inactive during the rearward throw of the toggle.

27. In gear shifting mechanism, gear shifting means, actuating elements for said means connected to swing in unison, swingingly mounted toggle levers, a pivot pin carried by one of said levers, a link pivotally mounted upon the other of said levers and provided with a slot freely accommodating said pin, the link being provided with means to coact with the pin and the toggle being movable forwardly across the pivotal center thereof for swinging said elements, means for swinging the toggle, cam faces on the link, and means to coact with the cam faces of the link for swinging the link independently relative to said pin and breaking the toggle at a point in its forward throw.

28. In gear shifting mechanism, gear shifting means, actuating elements for said means connected to swing in unison, swingingly mounted toggle levers, a pivot pin carried by one of said levers, a link pivotally mounted upon the other of said levers and provided with a slot freely accommodating said pin, the link being provided with means to coact with the pin and the toggle being movable forwardly across the pivotal center thereof for swinging said elements, means for swinging the toggle, cam faces on the link, and a spring pressed detent to coact with the cam faces of the link for swinging the link independently relative to said pin and breaking the toggle at a point in its forward throw as well as holding the link inactive during the rearward throw of the toggle.

29. In gear shifting mechanism, gear shifting means, actuating elements for said means connected to swing in unison, swingingly mounted toggle levers, a link pivotally connecting said levers to form a toggle movable forwardly across the pivotal center thereof for swinging said elements, means for swinging the toggle, and means for swinging the link independently and breaking the toggle at a point in its forward throw as well as resetting the toggle incident to the rearward throw thereof.

30. In gear shifting mechanism, gear shifting means, actuating elements for said means connected to swing in unison, swingingly mounted toggle levers, a pivot pin carried by one of said levers, a link pivotally mounted upon the other of said levers and provided with a slot freely accommodating said pin, the link being provided with means to coact with the pin and pivotally connecting the levers to form a toggle movable forwardly across the pivotal center thereof for swinging said elements, means for swinging the toggle, and means to coact with the link for swinging the link independently relative to said pin and breaking the toggle at a point in its forward throw as well as resetting the toggle incident to the rearward throw thereof.

31. In gear shifting mechanism, gear shifting means, actuating elements for said means connected to swing in unison, swingingly mounted toggle levers, a pivot pin carried by one of said levers, a link pivotally mounted upon the other of said levers and provided with a slot freely accommodating said pin, the link being provided with means to coact with the pin and pivotally connecting the levers to form a toggle movable forwardly across the pivotal center thereof for swinging said elements, means for swinging the toggle, cam faces on the link, and means coacting with the cam faces of the link for swinging the link independently relative to said pin and breaking the toggle at a point in its forward throw as well as resetting the toggle incident to the rearward throw thereof.

In testimony whereof we affix our signatures.

GLENN T. RANDOL. [L. S.]
ROBERT S. PLEXICO. [L. S.]